Sept. 7, 1954  R. B. BUCHNER  2,688,660
CIRCUIT-ARRANGEMENT FOR POSITIONING SWITCHES
Filed Dec. 22, 1950
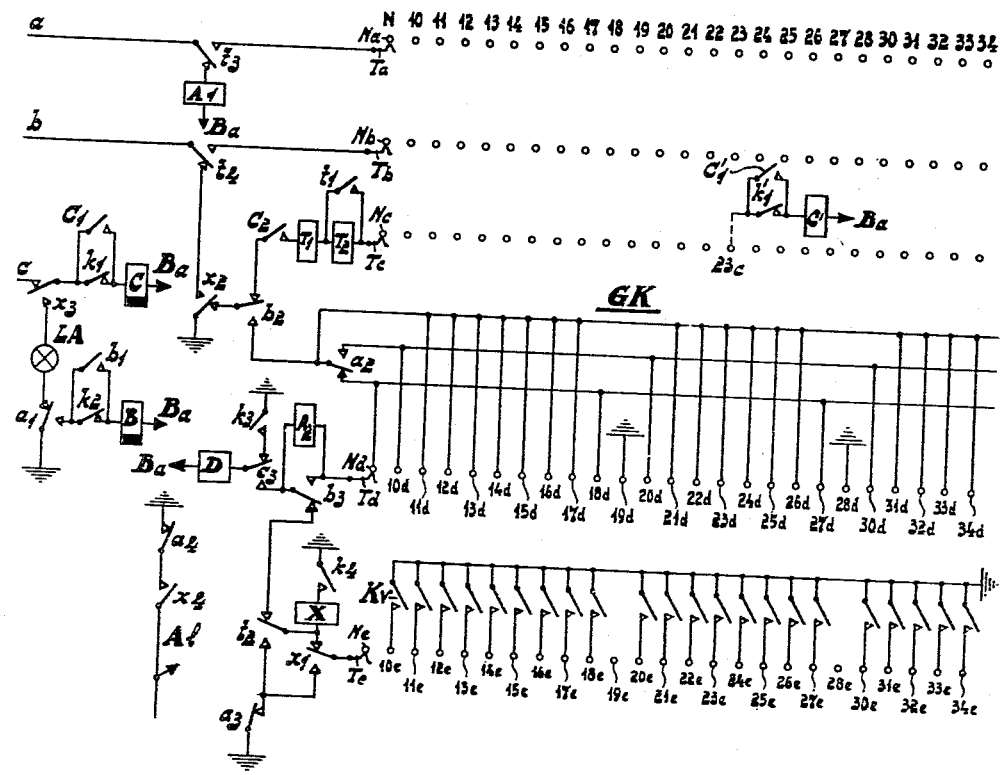
INVENTOR
Robert Bertold Buchner
By
AGENT Patented Sept. 7, 1954

2,688,660

UNITED STATES PATENT OFFICE 2,688,660

CIRCUIT-ARRANGEMENT FOR POSITIONING SWITCHES

Robert Bertold Buchner, Hilversum, Netherlands, assignor to Hartford National Bank and Trust Company, Hartford, Conn., as trustee Application December 22, 1950, Serial No. 202,344

Claims priority, application Netherlands February 7, 1950

2 Claims. (Cl. 179—18)

The invention relates to a circuit-arrangement in an automatic signalling system for setting a switch to a desired outlet, for example for finding a calling line by means of a call selector, or for setting a group selector to a free outlet in a definite numerical group.

It has been suggested in an automatic telephony system to provide circuit-arrangements in which test contacts of unwanted outlets of a switch are connected to a terminal of a battery, whereas test contacts of wanted outlets are not connected to the battery, the rotary magnet of the switch being included during the finding motion in a circuit between the wiper of the switch which wipes the test contacts and a second terminal of the battery. So long as the test wiper engages test contacts of unwanted outlets, the rotary magnet remains energized and the switch continues to move. However, as soon as the test wiper reaches a test contact of a wanted outlet, the energizing circuit of the rotary magnet is interrupted and the switch stops.

Thus, in this method a wanted outlet is characterized by the absence of voltage across a test contact. In view thereof, this method is sometimes referred to as the "method of voids."

The method of voids has a limitation in that the switch will be set to an unwanted or disturbed outlet, if, owing to any disturbance, such as a break in the wire, a bad contact or a blown safety fuse, the connection between the test contact and the battery is interrupted.

Such a disturbance will consequently prevent the switches from passing by the disturbed outlet. Hence none of the switches may be capable of reaching a wanted outlet, or not only the first switch, but also the other switches of the same group fall, as it were, into the same void, so that a complete selector stage is put out of action.

In practice use is therefore generally made of a method in which wanted outlets are marked in a positive way. The voltage across the test contacts is tested with the use of a test relay, which, upon being energized, interrupts the energizing circuit of the rotary magnet of the switch. The test contacts of wanted outlets are characterized by such a voltage that the test relay is energized, when a wanted outlet is reached, and arrests the switch. Test contacts of unwanted outlets are at such a voltage that the test relay is not energized when the test wiper passes by such a test contact.

Disturbed outlets are thus automatically marked unwanted, the switch passing by them. This method has a limitation in that, when the switch is positioned, a certain amount of time is lost, since the test relay must be energized prior to interruption of the energizing circuit of the rotary magnet and arrestment of the selector. Although quick-acting test relays are used in practice such a loss of time is frequently undesirable and in many cases even inadmissible, more particularly if use is made of fast-running switches which are required to be capable of testing a comparatively large group of outlets within a comparatively short period of time.

This limitation does not occur, or occurs at least to a lesser extent, in the methods of voids, in which the test voltages are tested directly by the rotary magnet.

The invention has for its object to obviate the aforesaid limitation of the method of voids, while conserving the advantage of this system.

It should be noted that a call finder circuit-arrangement is known per se in which the rotary magnet of the switch is included during the finding motion, in a circuit between a first terminal of a batery and a first test wiper of the switch, and the first test contacts of unwanted outlets wiped by this test wiper are connected to another terminal of the battery, whereas the first test contacts of wanted outlets are not connected to the battery.

Furthermore, a winding of a relay, under the control of which the loop wires are cut-through, is coupled with a second test wiper of the switch. The second test contacts of wanted outlets wiped by this test wiper are connected to a terminal of the battery so that the relay is energized and cuts through the loop wires, when the second test wiper reaches a test contact thus marked. The second test contacts of unwanted outlets are not connected to the battery.

Although in this circuit-arrangement the wanted outlets are marked twice, namely by a negative criterion (the absence of voltage) at the first test contact, and a positive criterion (the presence of voltage) at the second test contact; the aforesaid limitation of the method of voids is not removed. If, owing to a poor contact or otherwise, the first test contact of an unwanted outlet is dead, the switch stops at this outlet. Since in these circumstances the second test contact is not connected, the negative criterion at the first test contact is not removed and even other switches reaching the outlet concerned will be arrested.

The circuit-arrangement according to the invention, is arranged in a similar manner, a negative criterion being tested also by the rotary magnet, through a first test wiper, and a positive criterion through a second test wiper.

The circuit-arrangement according to the invention is characterized in that provision is made of means which are responsive when the first test wiper reaches a first test contact that is not connected to the voltage supply, whereas the second test wiper reaches a second test contact, which is at a potential such that the relay is not energized. Under the control of said means, the first test wiper is connected to the second terminal of the battery and the switch is permanently locked at the outlet engaged and is thus continually in a condition in which it cannot be reengaged. Moreover under the control of said means an alarm signal is given.

This measure ensures that, even after the caller's receiver is replaced on its rest, the disturbed outlet of the switch remains marked unwanted until the defect has been remedied.

In view thereof it should be noted that a circuit-arrangement is known in which the rotary magnet is connected between a terminal of a battery and a test wiper of the switch and unwanted outlets are connected to a further terminal of the battery, whereas wanted outlets are not connected, provision being made of a relay, a winding of which is connected between the test wiper and the second terminal of the battery. So long as the test wiper reaches test contacts of unwanted outlets, the winding of the relay is short-circuited. When a wanted outlet is reached, the rotary magnet is demagnetized and the relay is energized and then interrupts the connection between the rotary magnet and the test wiper and furthermore connects the test wiper to the second terminal of the battery. The outlet is thus marked unwanted for other switches, so long as the first switch remains engaged under the control of the station called. When the calling subscriber, after having found that an unwanted connection has been established, replaces the receiver on its rest and then tries again to establish the desired connection, the switch thus engaged will again make an untimely stop at the disturbed outlet.

In order that the invention may be more clearly understood and readily carried into effect, it will now be described in detail with reference to the accompanying drawing, the single figure of which shows in a diagrammatical and simplified form a circuit-arrangement for the numerical positioning of a group selector GK of fixed normal position and single motion under the control of pulses. The numerical setting of the switch to the first outlet of the desired group takes place with the use of a so-called escapement marking.

The d-contacts ($N_d$, $10_d$, $11_d$ and so on) wiped by the wiper $T_d$ of the switch constitute the escapement bow and are not multipled to contacts of other switches. The contacts wiped by the wipers $T_a$, $T_b$, $T_c$ and $T_d$ are multipled, in known manner (not shown in the figure) to similar contacts of other switches.

The figure shows by way of example two numerical groups of outlets and a part of a third group, which respectively comprise the outlets 10 to 19, 20 to 28 and 30 to 34. It is obvious that the number of outlets for the various groups can be increased or decreased according to circumstances and that the other groups (not shown) can be arranged similarly.

In the normal position of the switch the wipers $T_a$, $T_b$, $T_c$, $T_d$ and $T_e$ engage the break contacts $N_a$, $N_b$, $N_c$, $N_d$ and $N_e$ respectively. In addition, in its normal position the switch has its own contacts $k_1$ and $k_2$ closed, whereas the contacts $k_3$ and $k_4$ are open. Before the selector is engaged, the voltage of the C-conductor is tested in a known manner by means of a relay (not shown) at a preceding stage. The selector cannot be engaged if the C-conductor is open and hence, for example, if the selector does not take up its normal position and the break contact $k_1$ is open.

The selector is engaged by connecting the C-conductor to earth potential by way of a preceding stage, so that a circuit is established from earth via the C-conductor, break contact $k_3$ of relay X, break contact $k_1$ of the switch and the winding of a busy relay C to the terminal $B_a$ of a battery, the other terminal of which is connected to earth potential.

Relay C is energized in the said circuit and connects make contact $c_1$ in parallel with the break contact $k_1$, so that relay C remains energized, after the selector has left its normal position and the break contact $k_1$ has been opened. Relay C, by closing make contacts $c_2$ and $c_3$, also prepares circuits for the test relay T and the rotary magnet D.

Via loop wire $a$ and break contact $t_3$ of relay T the dial pulses are fed to the first winding $A_1$ of the pulse relay A. At the beginning of the first pulse, relay A is energized with the result that the shunt relay B is energized in a circuit from earth via make contact $a_1$ of relay A, break contact $k_2$, winding of relay B to battery $B_a$. Relay B completes a holding circuit for itself through make contact $b_1$, independent of break contact $k_2$.

During the dial pulse series said holding circuit is interrupted periodically at make contact $a_1$, but since relay B is slow-releasing, this relay remains held till after the end of the last dial pulse.

At the end of the first dial pulse, relay A is released and the rotary magnet D is energized in a circuit from earth via break contact $k_2$ of relay X, make contact $b_2$ of relay B, break contact $a_2$ of relay A, break-test contact $N_d$ and wiper $T_b$, make contact $b_3$, make contact $c_3$, rotary magnet D to battery $B_a$.

The selector thus moves until, when test contact $10d$ is reached by the wiper $T_d$, the energizing circuit of the rotary magnet D is interrupted, the selector being at the first outlet of the first numerical group.

Let us assume that the pulse series consists of two pulses. At the beginning of the second pulse relay A is re-energized, so that the rotary magnet D is nergized in the circuit from earth via break contact $x_2$, make contact $b_2$, make contact $a_2$, test contact $10d$, wiper $T_d$, make contacts $b_3$ and $c_3$, winding of rotary magnet D to battery.

The selector then moves further and passes by the outlets 11 to 17, since the test contacts $11d$ to $17d$ are connected to earth potential via make contact $b_2$ and break contact $x_2$ and stops at the outlet 18, of which the test contact $18d$ is not earthed.

At the end of the second pulse contact $18d$ is earthed via break contact $x_2$, make contact $b_2$ and break contact $a_2$ so that the rotary magnet is re-energized and the selector disengaged from outlet 18.

The selector passes by the outlet 19, of which test contact $19d$ is directly earthed and stops at the outlet 20, since this is the first outlet of the second numerical group, of which the test contact 20d is not earthed at this instant.

Since no subsequent dial pulses occur, relay B is released and the holding circuit of this relay is interrupted at make contact $a_2$, which initiates the finding movment of the switch to a free outlet in th second numerical group.

The free outlets are characterized in two different ways. Firstly they are marked in a negative manner by the fact that the corresponding test contacts ($20e$, $21e$ and so forth), which are wiped by the test wiper $T_e$, are not connected to earth, in contradistinction to the $e$-test contacts of engaged outlets, which are connected to earth through a contact KV of a switch in a subsequent selection stage, which contact is closed, when this switch does not occupy its normal position.

This criterion is tested by the rotary magnet D, which, after relay B is released, is included in a circuit from battry $B_a$ via winding of rotary magnet D, make contact $C_3$, break contact $b_3$, break contact $t_2$ of relay T and break contact $X_1$ of relay X to the test wiper $T_e$. The rotary magnet is energized in this circuit and the selector moves so long as the wiper $T_e$ engages an $e$ test contact of an engaged outlet, until wiper $T_e$ reaches a non-earthed $e$ test contact and the rotary magnet is demagnetized, with the result that the motion of the switch ceases.

If all the outlets of the group are engaged, the switch is stopped in any case on reaching the last outlet of the group the 28th $e$ test contact of which is not connected to earth, no matter whether this outlet is engaged or not engaged.

The free outlets of the selector are in addition marked positively, in known manner, by means of the $c$ test contacts, which are wiped by the test wiper $T_c$. This positive criterion is tested during the free finding motion of the selector, by the test relay T, of which the windings $T_1$ and $T_2$, after the release of relay B are included in a circuit from earth via break contact $x_2$, break contact $b_2$, make contact $c_2$, windings $T_1$ and $T_2$ to wiper $T_c$. The C-test contacts of free outlets are connected to the battery $B_a$, in a manner shown for the test contact 23C, via a break contact $k_1'$ of a switch in the subsequent selection stage and the winding $C^1$ of a busy relay of this switch.

If the wiper $T_c$ reaches the test contact of a free outlet, relay T is energized in the aforesaid circuit. However, since the C test contacts of engaged outlets are connected to earth via a low-ohmic winding of a test relay of a further switch, they are at a potential such that the relay T is not energized, if wiper $T_c$ reaches such a test contact.

Different situations may arise.

Firstly, the selector may be caused to stop by the rotary magnet D being demagnetized due to the absence of any earth connection at the $e$ test contact of a free outlet, which is not the last of the group. Relay T is thus energized and short-circuits by way of its make contact $t_1$, its high-ohmic winding, so that the potential of the C test contact varies such that the outlet is marked engaged. Owing to the release of the busy relay $C^1$ of the switch at the subsequent selection stage in series with relay T this switch is engaged.

Relay $C^1$ connects make contact $C_1{}^1$ in parallel with break contact $k_1'$, so that relays $C^1$ and T are held in series with each other, after the switch at the next following selection stage has left its normal position.

So long as the wiper $T_e$ engaged an earthed $e$ test contact during the free finding motion, the winding of the auxiliary relay X was short-circuited through break contact $x_1$ of relay X, wiper $T_e$, $e$ test contact, make contact KV of the switch at the next following selection stage to earth and furthermore through make contact $k_4$.

When a free outlet is reached, this short-circuit is removed and a circuit is formed from earth via make contact $k_4$, winding of relay X, break contact $t_2$ of relay T, break contact $b_3$, make contact $C_3$ and the winding of rotary magnet D to battery $B_a$. The resistance of the winding of relay X is high with respect to that of rotary magnet D, so that only a comparatively low current can still pass through the rotary magnet and the rotary magnet is substantially demagnetized. The time of release of relay X exceeds that of relay T, so that the said circuit is interrupted through the winding of relay X at break contact $t_2$ of relay T, before the relay is capable of becoming operative in this circuit, the rotary magnet D being at the same time entirely demagnetized. Make contact $t_2$ of relay T connects to earth the test wiper $T_e$ through break contact $x_1$ of relay X and break contact $a_3$ of relay A, so that any other switch is prevented from being set to this outlet. The make contacts $t_3$ and $t_4$ of relay T directly connect the loop wires $a$ and $b$ to the wipers $T_a$ and $T_b$ and the positioning of the selector is thus completed.

On termination of the conversation the earth connection at the preceding stage is removed from the C-conductor and relay C is released. Thus at break contact $c_2$ the energizing circuit of relay T is opened, while furthermore the rotary magnet D is energized in the circuit from earth via make contact $k_3$, break contact $c_3$, winding of the rotary magnet D to battery.

The selector then moves further, until this circuit is interrupted to make contact $k_3$, when the the selector has reoccupied its normal position.

It will now be assumed that the switch stops at an engaged outlet, the absence of any earth connection at the $e$ test contact being due to a disturbance, for example to a poor make contact KV in a switch at the next following stage.

Since the outlet via the $c$ test contact is marked engaged, relay T is not energized and relay X is magnetized in the aforesaid circuit from earth via make contact $k_4$, winding of relay X, break contact $t_2$, break contact $b_3$, make contact $c_3$, winding of the rotary magnet D to battery $B_a$.

Relay X connects the wiper $T_e$ to earth potential via its make contact $x_1$ and break contact $a_3$ of relay A, so that any other switch is prevented from being set to the disturbed outlet. Via make contact $x_2$ and break contact $t_4$ the loop wire $b$ is connected to earth potential, so that a signal is supplied to a connecting circuit (not shown) to indicate that the desired connection cannot be established and the calling subscriber receives a busy tone.

Owing to the closure of make contact $x_3$ of relay X, relay C is included in a permanent holding circuit from earth via break contact $a_1$, alarm lamp LA, make contact $c_1$, winding of relay C to battery. The alarm lamp LA is brought to incandescence in this circuit and thus provides an indication of the area of the disturbance.

Relay C is slow-releasing so that the relay is not de-energized during the change-over of the armature of the make-and-break contact $x_3$. Even after, when the connection is interrupted, the earth connection is removed from the C-conductor, relay C remains held. Consequently, the selector is permanently locked at the disturbed outlet engaged and fills, as it were, the disturbance void in the marking of the $e$ contacts.

Since break contact $x_3$ is open, the switch cannot be re-engaged.

Owing to the opening of the break contact $x_2$ any energizing circuit for relay T is interrupted. If the switch associated with the disturbed outlet is disengaged at the next following selection stage, relay T cannot be energized, which would otherwise result since owing to the opening of break contact $t_2$, relay X would be released and owing to the opening of make contact $x_3$, relay C would also be demagnetized.

The closure of contact $x_4$ of relay X in series with break contact $a_4$ of relay A has the effect of connecting the alarm conductor $A_1$ to earth, with the result that an acoustical or visual alarm device is operated and the operating staff's attention is drawn to the occurrence of a disturbance.

Finally, consideration will be given to the case in which a disturbance does not occur and all the preceding outlets are engaged, the switch being compelled to stop at the last outlet (28) of the group. If the latter outlet is free, relay T is energized and the further process proceeds entirely as in the example described above for a preceding free outlet.

However, if this outlet is engaged, relay T is not energized, so that relay X is energized, as in the case of a disturbed outlet. Via make contact $x_2$ and break contact $t_4$ the loop wire $b$ is connected to earth and a signal is supplied to the connecting circuit, indicating that the desired connection cannot be established. The $d$ test contact $28d$ of the last outlet of the group is earthed. The second winding $A_2$ of pulse relay A is thus connected in parallel with the winding of relay X. Before relay X is energized, relay A is energized in the circuit via test contact $28d$, wiper $T_d$, winding $A_2$, make contact $c_3$, winding of the rotary magnet D to battery $B_a$. The winding $A_2$ has a high resistance relative to that of the winding of the rotary magnet D, so that only a comparatively low current will pass through the winding of the rotary magnet D.

Since break contact $a_3$ opens before make contact $x_1$ closes, the wiper $T_e$ and hence also test contact $28e$ are not earthed and there is no possibility that a further switch of the same selection stage, which happens to reach the outlet 28 at the same instant, may find an earth connection at the corresponding test contact $28e$ and may pass beyond the group.

Since break contact $a_1$ is open, a permanent holding circuit for relay C is not formed upon closure of contact $x_3$. Relay C is consequently de-energized, whereupon the switch re-assumes its normal position in the manner described above.

Although, make contact $a_1$ closes during the release of relay A, relay B is not energized, since break contact $k_2$ is open, when the switch leaves its normal position.

Furthermore, in this case, a warning is not given upon closure of contact $k_4$, since break contact $a_4$ is open.

It is obvious that the circuit-arrangement may be varied in different ways within the scope of the invention.

What I claim is:

1. In an automatic dial signalling system a switch provided with a plurality of outlets each having first and second test contacts, said switch including a rotary electro-magnet actuating first and second test wipers to find a desired outlet, and apparatus for setting said switch to the desired outlet, said apparatus comprising a voltage supply source having first and second terminals, means responsive to dial signals to initiate the finding operation of said switch, means connecting said electromagnet during the finding movement in a circuit between said first terminal and said first test wiper, the first test contacts of the unwanted outlets wiped by said first test wiper being connected to said second terminal of said source, the first test contact of wanted outlets not being connected to said source, a test relay associated with said switch and having a winding connected between said second test wiper and said second voltage terminal, means to apply a potential to the second test contacts of wanted outlets wiped by said second wiper having a value at which the test relay upon reaching such second test contact is non-responsive, an alarm indicator, and means responsive when the first test wiper reaches a first test contact not connected to said source and the second test wiper reaches a second test contact having a potential at which said relay is non-responsive for connecting the first test wiper to said second terminal of said source and for energizing said indicator to provide an alarm indication.

2. The combination, as set forth in claim 1, wherein said test relay includes a break contact and further comprising an auxiliary relay having a winding, a make contact and first and second break contacts, the winding of the auxiliary relay being connected via said first break contact between said first test wiper of the source and said second terminal of the source, an energizing circuit for said test relay including the second break contact of said auxiliary relay, said break contact of said test relay being connected between the winding of the auxiliary relay and the rotary electromagnet of the switch.

References Cited in the file of this patent

UNITED STATES PATENTS

| Number | Name | Date |
| --- | --- | --- |
| 2,068,726 | Wochinger | Jan. 26, 1937 |